US008766891B2

(12) United States Patent
Yang et al.

(10) Patent No.: US 8,766,891 B2
(45) Date of Patent: Jul. 1, 2014

(54) DISPLAY APPARATUS

(75) Inventors: Ji-Yeon Yang, Yongin (KR);
JongWoung Park, Yongin (KR);
Geun-Young Jeong, Yongin (KR);
Ju-Hyung Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 274 days.

(21) Appl. No.: 13/137,892

(22) Filed: Sep. 21, 2011

(65) Prior Publication Data

US 2012/0293490 A1 Nov. 22, 2012

(30) Foreign Application Priority Data

May 18, 2011 (KR) .................. 10-2011-0046790

(51) Int. Cl.
*G09G 3/36* (2006.01)
(52) U.S. Cl.
USPC ............................... 345/87; 345/174; 348/54
(58) Field of Classification Search
USPC ......... 345/55, 60, 76, 87, 204–206, 173, 174; 349/56, 84; 348/54
See application file for complete search history.

(56) References Cited

U.S. PATENT DOCUMENTS

| | | | |
|---|---|---|---|
| 7,420,637 B2 | 9/2008 | Imai et al. | |
| 8,411,359 B2 * | 4/2013 | Hasegawa et al. | 359/464 |
| 8,502,444 B2 * | 8/2013 | Chu et al. | 313/504 |
| 2005/0243253 A1 | 11/2005 | Imai et al. | |
| 2006/0012593 A1 * | 1/2006 | Iriguchi et al. | 345/204 |
| 2006/0145968 A1 * | 7/2006 | You et al. | 345/76 |
| 2007/0120973 A1 | 5/2007 | Kim et al. | |
| 2009/0046142 A1 * | 2/2009 | Cha et al. | 348/54 |
| 2009/0086150 A1 | 4/2009 | Koyama et al. | |
| 2009/0103177 A1 * | 4/2009 | Jang et al. | 359/462 |
| 2009/0185088 A1 | 7/2009 | Shinohara | |
| 2010/0026938 A1 * | 2/2010 | Hattori et al. | 349/96 |
| 2010/0117981 A1 | 5/2010 | Chen et al. | |
| 2010/0182291 A1 * | 7/2010 | Kim et al. | 345/205 |
| 2010/0289729 A1 * | 11/2010 | Nakamura | 345/76 |
| 2011/0012893 A1 * | 1/2011 | Iriguchi et al. | 345/214 |
| 2011/0050657 A1 * | 3/2011 | Yamada | 345/204 |
| 2012/0081330 A1 | 4/2012 | Park et al. | |

FOREIGN PATENT DOCUMENTS

| | | |
|---|---|---|
| CN | 101782695 A | 7/2010 |
| CN | 101796562 A | 8/2010 |
| CN | 202693960 U | 1/2013 |
| EP | 2184666 A2 | 5/2010 |
| EP | 2437143 A2 | 4/2012 |
| KR | 10 2005-0016406 A | 2/2005 |
| KR | 10-2007-0044479 A | 4/2007 |

(Continued)

*Primary Examiner* — Tom Sheng
(74) *Attorney, Agent, or Firm* — Lee & Morse, P.C.

(57) ABSTRACT

A display apparatus includes a first substrate opposite a second substrate, a plurality of electrode patterns in the second substrate, the plurality of electrode patterns extending along a first direction, a plurality of barrier patterns in the second substrate, the plurality of barrier patterns being insulated from the electrode patterns and extending along a second direction crossing the first direction, and a plurality of pixels, the first and second substrates with the pixels defining a display panel, and each pixel including a gate line extending along a third direction, a data line extending along a fourth direction, and a pixel electrode electrically connected to the gate line and the data line, the pixel electrode being configured to generate an electric field with a corresponding electrode pattern of the plurality of electrode patterns to display an image.

23 Claims, 14 Drawing Sheets

(56) References Cited  * cited by examiner

FOREIGN PATENT DOCUMENTS

| KR | 10 2007-0056643 A | 6/2007 |
| KR | 10-0824539 B1 | 4/2008 |
| KR | 10-2009-0080487 A | 7/2009 |

DISPLAY APPARATUS

BACKGROUND

1. Field

Embodiments of the inventive concepts relate generally to a display apparatus. More particularly, embodiments of the inventive concepts relate to a display apparatus including barrier patterns that displays a stereoscopic image and detects an external touch.

2. Description of Related Art

A display apparatus, e.g., a stereoscopic image display apparatus, with a touch panel is an electronic visual display configured to detect a touch event occurring on a display area and to receive a user's command corresponding to the touch event. The display apparatus with the touch panel does not require an additional input device, e.g., a keyboard and/orb a mouse, and thus, the application thereof is continuously expanding.

The touch panel of a display apparatus may be, e.g., a resistive sensing touch panel, an optical sensing touch panel, or a capacitive sensing touch panel. For example, the capacitive sensing touch panel may be configured to measure a change in capacitance caused by touching the surface of the touch panel.

The stereoscopic image display apparatus refers to a display that realizes a three-dimensional, i.e., stereoscopic, image. In the stereoscopic image display apparatus, the stereoscopic image may be realized using a binocular disparity that refers to the difference in image location of an object seen by the left and right eyes. To detect a touch event and realize a stereoscopic image, a display apparatus may require a display panel for displaying a stereoscopic image and a touch panel for detecting a touch event.

SUMMARY

Embodiments provide a display apparatus with barrier patterns configured to both realize a stereoscopic image and to perceive a touch event.

According to example embodiments of the inventive concepts, a display apparatus may include a display panel, a plurality of electrode patterns, and a plurality of barrier patterns.

According to some example embodiments, a display apparatus may include a first substrate opposite a second substrate, a plurality of electrode patterns in the second substrate, the plurality of electrode patterns extending along a first direction, a plurality of barrier patterns in the second substrate, the plurality of barrier patterns being insulated from the electrode patterns and extending along a second direction crossing the first direction, and a plurality of pixels, the first and second substrates with the pixels defining a display panel, and each pixel including a gate line extending along a third direction, a data line extending along a fourth direction, and a pixel electrode electrically connected to the gate line and the data line, the pixel electrode being configured to generate an electric field with a corresponding electrode pattern of the plurality of electrode patterns to display an image.

The first and third directions may be parallel to each other, and the second and fourth directions may be parallel to each other.

Each pixel of the plurality of pixels may further include a storage line spaced apart from the gate line and parallel thereto.

The storage line may be connected to a corresponding electrode pattern of the plurality of electrode patterns.

Each pixel of the plurality of pixels may further include a storage electrode extending from the storage line to face at least a portion of the pixel electrode.

Each pixel of the plurality of pixels may further include a color filter overlapping the pixel electrode to realize one of red, green, and blue colors.

The plurality of pixels may include at least a red pixel configured to display red color, a green pixel configured to display green color, and a blue pixel configured to display blue color, the plurality of pixels being arranged to have every two pixels adjacent to each other in the second direction display different colors.

Every two pixels adjacent to each other in the first direction may display a same color.

Each pixel of the plurality of pixels may have a first width along the first direction and a second width along the second direction, the first width being greater than the second width.

The barrier patterns may be configured to transmit first and second images to first and second positions located outside the apparatus, respectively, the first and second images being generated from two different groups of pixels to display a stereoscopic image.

The barrier patterns may include at least one conductive material capable of absorbing or shielding a light, the electrode patterns being between the first substrate and the barrier patterns.

The apparatus may further include a driving circuit configured to provide a driving signal to the gate line, to the data line, and to the electrode patterns, the display panel further comprising a display area with the pixels and a non-display area, and the driving circuit being disposed in a portion of the non-display area adjacent to the display area in the second direction.

The apparatus may further include a driving circuit configured to provide a driving signal to the gate line, to the data line, and to the electrode patterns, the display panel further comprising a display area with the pixels and a non-display area, and the driving circuit being disposed in a portion of the non-display area adjacent to the display area in the first direction.

The electrode patterns and the barrier patterns may be disposed in the second substrate to face the first substrate, the electrode patterns being interposed between the first substrate and the barrier patterns.

The apparatus may further include a liquid crystal layer interposed between the first substrate and the second substrate.

Each pixel of the plurality of pixels may further include a switching device including a gate electrode extending from the gate line, a source electrode extending from the data line, and a drain electrode connected to the pixel electrode.

The barrier patterns may include at least one conductive material capable of absorbing or shielding a light.

The first and fourth directions may be parallel to each other, and the second and third directions are parallel to each other.

The apparatus may further include a storage line spaced apart from the data line and parallel thereto.

The storage line may be connected to a corresponding electrode pattern of the plurality of electrode patterns.

Each pixel of the plurality of pixels may further include a color filter facing the pixel electrode to realize one of red, green, and blue colors.

The pixels may include at least a red pixel configured to display red color, a green pixel configured to display green color, and a blue pixel configured to display blue color, the pixels being arranged to have every two adjacent pixels in the second direction display different colors.

Every two adjacent pixels adjacent in the first direction may display a same color.

The first substrate may include a first base substrate, the gate line being on the first base substrate, the data and storage lines being on the first base substrate and on the gate line, the data and storage lines being electrically isolated from the gate line.

In some embodiments, the display panel may include a first substrate, a second substrate opposite the first substrate, and a plurality of pixels, the electrode patterns may be provided in the second substrate to extend along a first direction, and the barrier patterns may be provided in the second substrate to extend along a second direction crossing the first direction. Here, the barrier patterns may be electrically insulated from the electrode patterns. Each of the pixels may include a gate line extending along the first direction, a data line extending along the second direction, and a pixel electrode electrically connected to the gate line and the data line. The pixel electrode may generate an electric field in conjunction with the corresponding one of the electrode patterns, thereby displaying a gradation of an image.

In some other embodiments, a display apparatus may include a first substrate, a second substrate opposite the first substrate, and a plurality of pixels. The barrier patterns may be provided in the second substrate to extend along a first direction. The electrode patterns may be provided in the second substrate to extend along a second direction crossing the first direction. Here, the electrode patterns may be electrically insulated from the barrier patterns. Each of the pixels may include a gate line extending along the first direction, a data line extending along the second direction, a storage line spaced apart from the data line to extend along the second direction, and a pixel electrode electrically connected to the gate line and the data line. The pixel electrode may generate an electric field in conjunction with the corresponding one of the electrode patterns, thereby displaying a gradation of an image.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
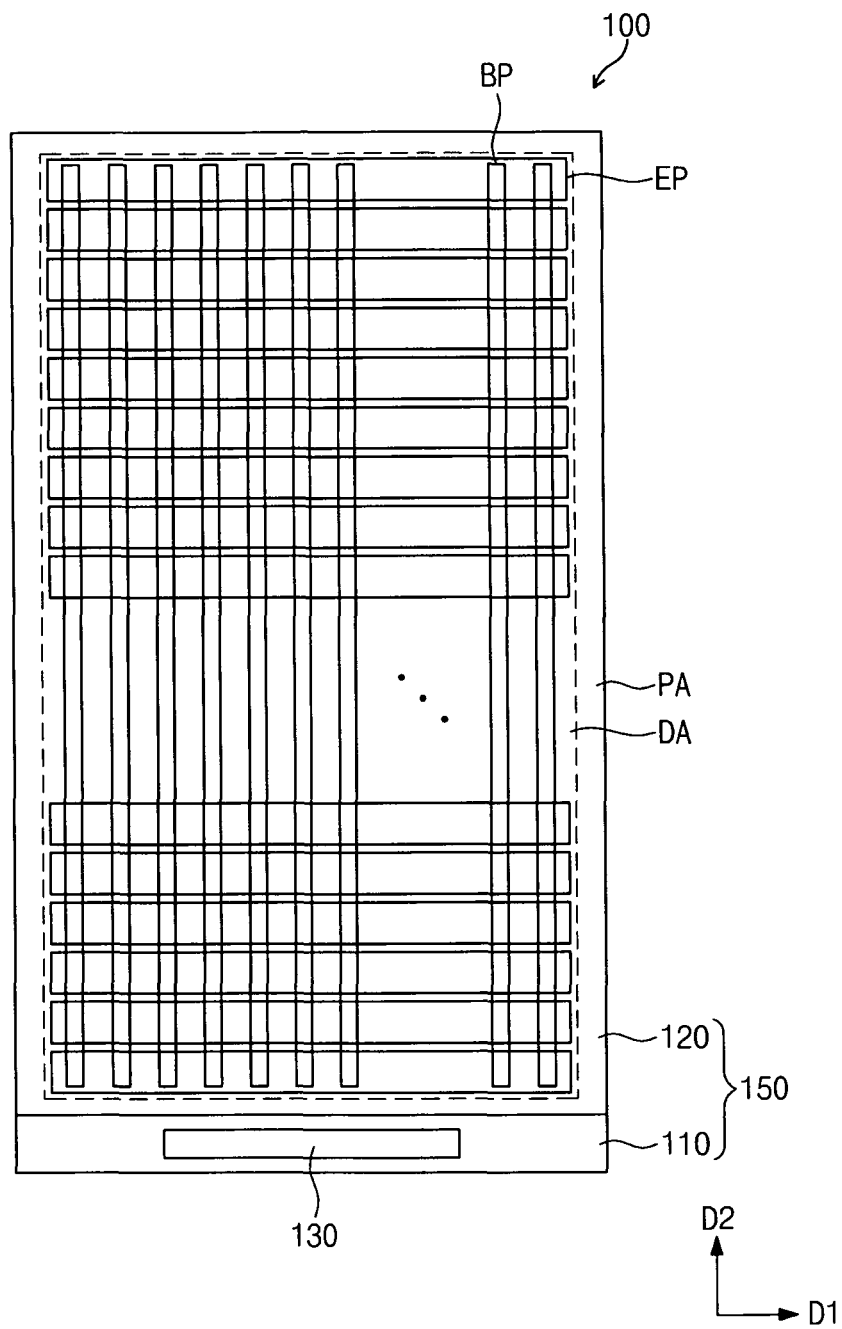
FIG. 1 illustrates a schematic plan view of a display apparatus according to example embodiments.

Korean Patent Application No. 10-2011-0046790, filed on May 18, 2011, in the Korean Intellectual Property Office, and entitled: "Display Apparatus," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

It will be understood that when an element, e.g., a layer, is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Further, it will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout.

It should also be noted that the figures are intended to illustrate the general characteristics of methods, structures, and/or materials utilized in certain example embodiments and to supplement the written description provided below. The drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity.

As used herein the term "and/or" includes any and all combinations of one or more of the associated listed items. It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a plan view of a display apparatus according to example embodiments. Referring to FIG. 1, a display apparatus 100 may include a display panel 150 and a driving circuit 130 configured to provide a driving signal to the display panel 150. The display panel 150 may include a first substrate 110 and a second substrate 120 opposite the first substrate 110. Although not depicted in FIG. 1, a liquid crystal layer may be interposed between the first substrate 110 and the second substrate 120.

The first substrate 110 may be divided into a display area DA provided with a plurality of pixels (not shown) and a non-display area PA provided with the driving circuit 130 or signal lines (not shown). The display area DA may be used to display an image, e.g., gradation of an image. As shown in FIG. 1, the first substrate 110 may have an area greater than the second substrate 120 so that the driving circuit 130 can be mounted on the first substrate 110.

Although not depicted in FIG. 1, a plurality of gate lines, a plurality of data lines, a plurality of switching devices connected to the gate lines and the data lines, and a plurality of pixel electrodes connected to the switching devices may be provided on the first substrate 110. Here, the gate lines and the data lines may extend along first and second directions D1 and D2, respectively, crossing each other. A configuration or structure of the first substrate 110 will be described below in more detail with reference to FIGS. 2 and 3.

There may be a plurality of electrode patterns EP and a plurality of barrier patterns BP in the second substrate 120. The electrode patterns EP may extend along the first direction D1 and the barrier patterns BP may extend along the second direction D2. In other words, the electrode patterns EP may be arranged along the second direction D2, i.e., the electrode patterns EP may be spaced apart from each other along the second direction D2, and the barrier patterns BP may be arranged along the first direction D1, i.e., the barrier patterns BP may be spaced apart from each other along the first direction D1. In addition, the barrier patterns BP may be electrically isolated from the electrode patterns EP. According to example embodiments of the inventive concepts, the barrier patterns BP may enable a viewer to perceive a stereoscopic image. That is, the barrier patterns BP may be configured to allow each eye to see a different group of the pixels, i.e., the barrier patterns BP may be configured to allow each eye to see a slightly different image. For instance, due to the presence of the barrier patterns BP, lights emitted from a first group of the pixels may be delivered to a left eye of a viewer located at a specific external position and lights emitted from a second group of the pixels, i.e., a different group of pixels, may be delivered to a right eye of the viewer, i.e., so the different images delivered to each eye, e.g., gradation image, may be perceived together as a stereoscopic image.

In addition, the electrode patterns EP and the barrier patterns BP may be configured to detect an external touch event on the display area DA. For example, the barrier patterns BP may include a conductive material and/or a material capable of absorbing or shielding a light, e.g., the barrier patterns BP may be formed of at least one conductive material capable of absorbing or shielding a light. As such, application of voltage to both the electrode patterns EP and the barrier patterns BP may facilitate detection of external touch, as will be discussed in more detail below with reference to FIGS. 4A through 7.

The driving circuit 130 may be disposed in a portion of the non-display area PA of the first substrate 110 not facing the second substrate 120. The driving circuit 130 may be directly formed on the first substrate 110 using a deposition process. Alternatively, the driving circuit 130 may be provided in a chip-on-glass manner.

The driving circuit 130 may include a gate driver providing a gate signal to at least one of the gate lines and a data driver providing a data signal to at least one of the data lines. The driving circuit 130 may be configured to apply a reference voltage or sensing signals to the electrode patterns EP or to measure voltages of the barrier patterns BP.

As shown in FIG. 1, the display area DA may include a first pair of opposite sides parallel to the second direction D2 and a second pair of opposite sides that are parallel to the first direction D1 and are shorter than the first pair of opposite sides. In some embodiments, the driving circuit 130 may be disposed in the non-display area PA adjacent to one of the short sides of the display area DA and along the first direction D1. This configuration of the driving circuit 130 may be applied to realize a small-size display device, e.g., a cellular phone or a smartphone, or a specific large-size display device, but example embodiments of the inventive concepts are not be limited thereto. For instance, in other embodiments, the driving circuit 130 may be disposed in the non-display area adjacent to one of the long sides of the display area DA along the second direction D2.

Figure 2:
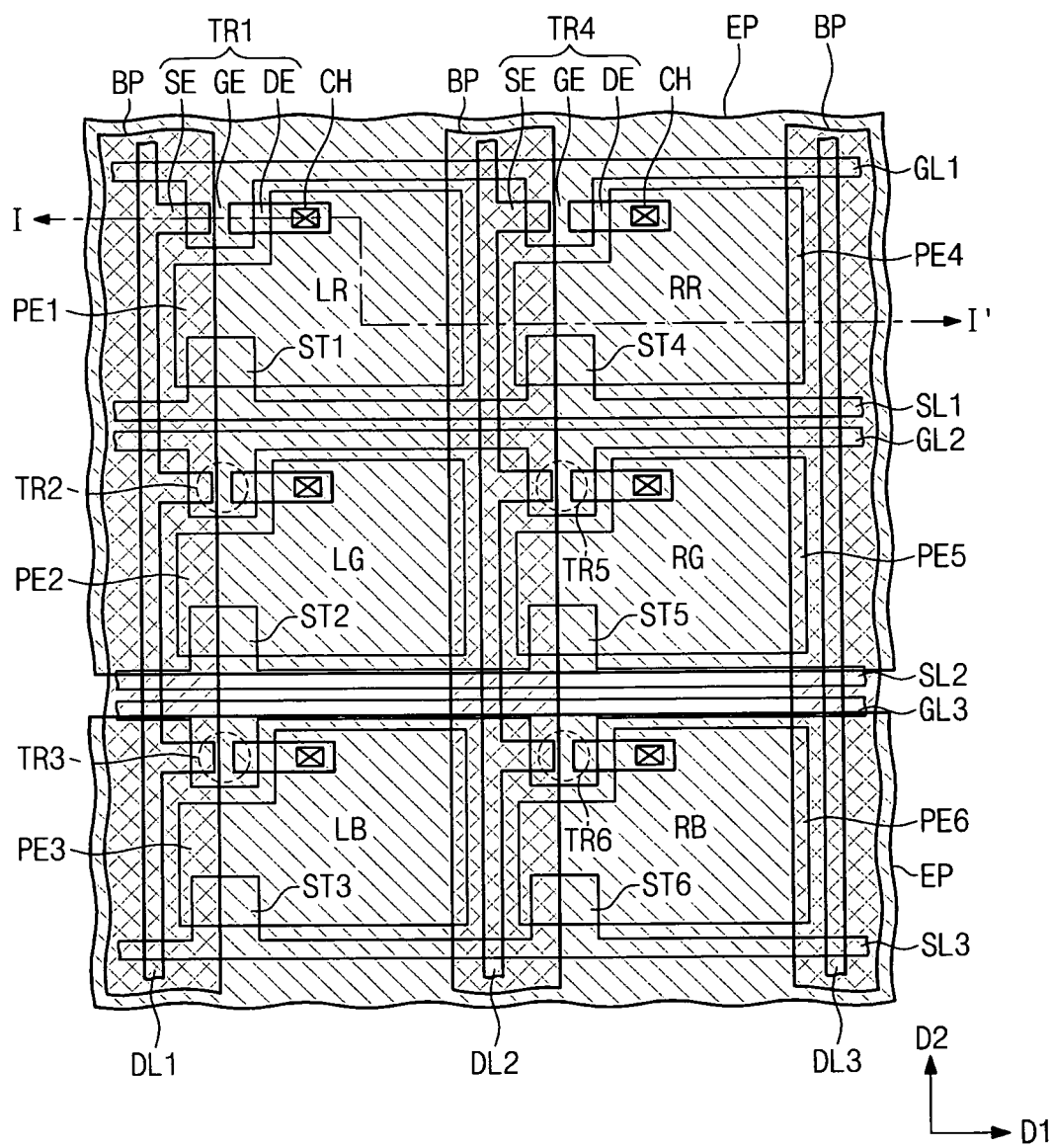
FIG. 2 illustrates an enlarged partial plan view of the display apparatus in FIG. 1.
Figure 3:
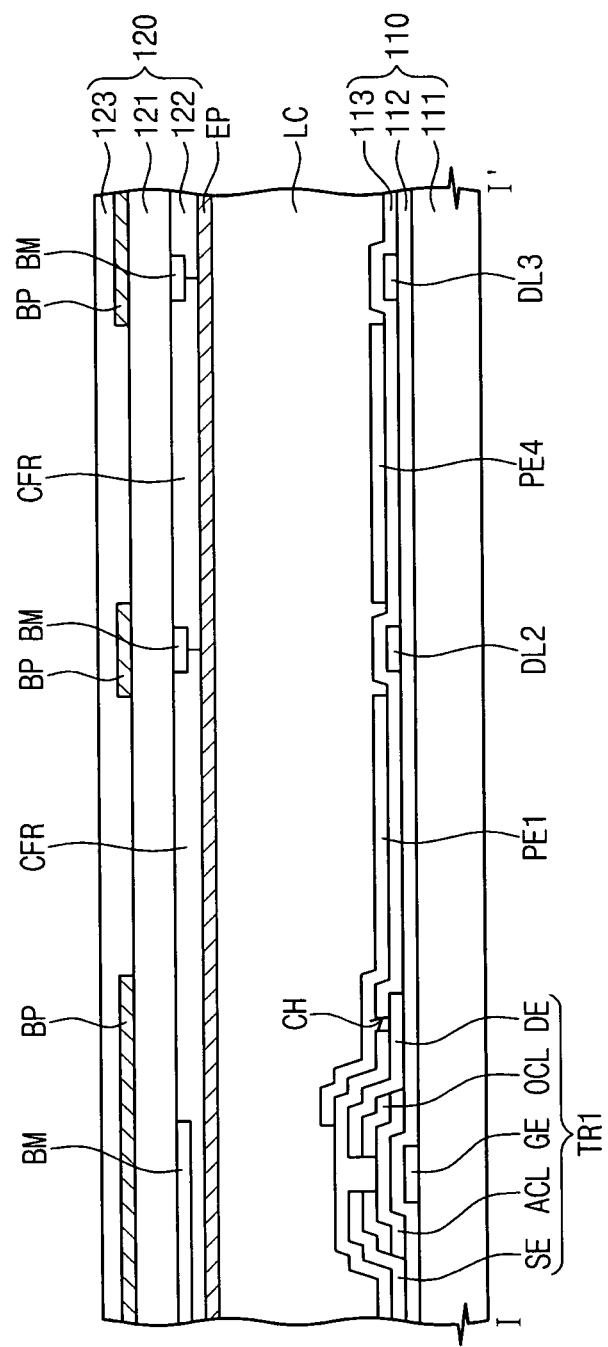
FIG. 3 illustrates a sectional view taken along a line I-I' of FIG. 2.

FIG. 2 is an enlarged plan view of the display apparatus shown in FIG. 1, and FIG. 3 is a sectional view taken along a line I-I' of FIG. 2. In more detail, FIG. 2 shows an exemplary enlarged view of six pixel regions that correspond to a portion of the pixels described with reference to FIG. 1.

Referring to FIG. 2, the display apparatus 100 may include a plurality of gate lines, e.g., first to third gate lines GL1 to GL3, which may extend along the first direction D1 and be separated from each other. Further, the display apparatus 100 may include a plurality of data lines, e.g., first to third data lines DL1 to DL3, which may extend along the second direction D2 to cross the gate lines, e.g., the first to third gate lines GL1 to GL3, and be separated from each other. The display apparatus 100 may include a plurality of transistors, e.g., first to sixth thin-film transistors TR1 to TR6, which may be connected to the gate lines, e.g., first to third gate lines GL1 to GL3, and to the data lines, e.g., first to third data lines DL1 to DL3, to serve as switching devices.

Each of the first to sixth thin-film transistors TR1 to TR6 may be connected to a corresponding one of the first to third gate lines GL1 to GL3 and to a corresponding one of the first to third data lines DL1 to DL3. In detail, the first thin-film transistor TR1 may be connected to the first gate line GL1 and the first data line DL1, the second thin-film transistor TR2 may be connected to the second gate line GL2 and the first data line DL1, the third thin-film transistor TR3 may be connected to the third gate line GL3 and the first data line DL1, the fourth thin-film transistor TR4 may be connected to the first gate line GL1 and the second data line DL2, the fifth thin-film transistor TR5 may be connected to the second gate line GL2 and the second data line DL2, and the sixth thin-film transistor TR6 may be connected to the third gate line GL3 and the second data line DL2. Each of the first to sixth thin-film transistors TR1 to TR6 may include a gate electrode GE connected to, e.g., extending from, the corresponding gate line, a source electrode SE connected to, e.g., extending from, the corresponding data line, and a drain electrode DE separated from the source electrode SE.

The display apparatus 100 may further include a plurality of pixels, e.g., first to sixth pixel electrodes PE1 to PE6, which may be connected to the drain electrodes DE of corresponding transistors, e.g., first to sixth thin-film transistors TR1 to TR6, through contact holes CH.

The display apparatus 100 may further include storage lines, e.g., first to third storage lines SL1 to SL3, which may extend along the first direction D1 and be spaced apart from the gate lines, e.g., first to third gate lines GL1 to GL3. The display apparatus 100 may further include storage electrodes connected to, e.g., extending from, the storage lines. For example, first and fourth storage electrodes ST1 and ST4 may be connected to the first storage line SL1, second and fifth storage electrodes ST2 and ST5 may be connected to the second storage line SL2, and third and sixth storage electrodes ST3 and ST6 may be connected to the third storage line SL3. The first to sixth storage electrodes ST1 to ST6 may be disposed to face the first to sixth pixel electrodes PE1 to PE6, respectively, thereby forming storage capacitors.

Referring to FIGS. 2-3, the display apparatus 100 may include the first substrate 110, the second substrate 120, and a liquid crystal layer LC interposed between the first and second substrates 110 and 120.

The first substrate 110 may include a first base substrate 111, a gate electrode GE disposed on the first base substrate 111, and a first insulating layer 112 disposed on the gate electrode GE and the first base substrate 111. The first base substrate 111 may be formed of, e.g., a transparent glass substrate or a plastic substrate, and the first insulating layer 112 may be formed of a transparent insulating material, e.g., a silicon nitride ($SiN_x$) layer or a silicon oxide ($SiO_x$) layer.

An active layer ACL and an ohmic contact layer OCL may be disposed on a portion of the first insulating layer 112 adjacent to the gate electrode GE. A source electrode SE and a drain electrode DE spaced apart from each other may be disposed on the ohmic contact layer OCL and the first insulating layer 112. The first to third data lines DL1 to DL3 may be disposed on the first insulating layer 112.

A second insulating layer 113 may be disposed on the source electrode SE, the drain electrode DE, and the first to third data lines DL1 to DL3. The first to sixth pixel electrodes PE1 to PE6 may be disposed on the second insulating layer 113. The second insulating layer 113 may be formed to define the contact holes CH, each of which exposes at least a portion of the drain electrode DE. The first pixel electrode PE1 may be connected to the drain electrode DE of the first thin-film transistor TR1 through the contact hole CH.

The second substrate 120 may include a second base substrate 121, a black matrix BM disposed on the second base substrate 121, a color filter layer 122 disposed on the black matrix BM and the second base substrate 121. The color filter layer 122 may include a red color filter CFR realizing red color, a green color filter realizing green color, and a blue color filter realizing blue color. The electrode patterns EP may be disposed on the color filter layer 122.

The second substrate 120 may include the barrier patterns BP, which may be disposed on the second base substrate 121 to face the electrode patterns EP. For example, as illustrated in FIG. 3, the barrier patterns BP and the black matrix BM may be positioned on opposite surfaces of the second base substrate 121, and may at least partially overlap. For example, the second base substrate 121 may be between the barrier patterns BP and the electrode patterns EP, e.g., the color filter layer 122, the black matrix BM, the second base substrate 121, and the barrier patterns BP may be sequentially stacked on the electrode patterns EP. For example, as illustrated in FIGS. 2-3, the barrier patterns BP may overlap respective data lines and source electrodes.

The second substrate 120 may include a polarizing film 123 disposed on the barrier patterns BP. The polarizing film 123 may be configured to convert light of undefined or mixed polarization into light with a predetermined, well-defined polarization (e.g., linear polarization). Although not depicted in FIG. 3, there may be an alignment layer controlling orientation of the liquid crystalline molecules in the liquid crystal layer LC, on the first and fourth pixel electrode PE1 and PE4 and the electrode patterns EP.

Referring back to FIG. 2, the first data line DL1, the first gate line GL1, the first thin-film transistor TR1, and the first pixel electrode PE1 may constitute a first pixel LR configured to emit a red light. The first data line DL1, the second gate line GL2, the second thin-film transistor TR2, and the second pixel electrode PE2 may constitute a second pixel LG configured to emit a green light. The first data line DL1, the first gate line GL3, the third thin-film transistor TR3, and the third pixel electrode PE3 may constitute a third pixel LB configured to emit a blue light. In other words, the first, second, and third pixels LR, LG, and LB may be red, green, and blue pixels, respectively.

Similarly, the second data line DL2, the first gate line GL1, the fourth thin-film transistor TR4, and the fourth pixel electrode PE4 may constitute a fourth pixel RR configured to emit a red light. The second data line DL2, the second gate line GL2, the fifth thin-film transistor TR5, and the fifth pixel electrode PE5 may constitute a fifth pixel RG configured to emit a green light. The second data line DL2, the third gate line GL3, the sixth thin-film transistor TR6, and the sixth pixel electrode PE6 may constitute a sixth pixel RB configured to emit a blue light. In other words, the fourth, fifth, and sixth pixels RR, RG, and RB may be red, green, and blue pixels, respectively.

Depending on positions and/or arrangements of the barrier patterns BP, lights emitted from the first to third pixels LR, LG and LB may be transmitted to a first position located outside the display apparatus 100, and lights emitted from the fourth to sixth pixel RR, RG and RB may be transmitted to a second position located outside the display apparatus 100. In detail, the display apparatus 100 may be configured in such a way that the first and second positions correspond to both eyes, respectively, of a viewer located at a specific position outside the display apparatus 100. This enables the viewer to perceive a stereoscopic image.

To provide better understanding of a relative arrangement between the first to sixth pixels LR, LG, LB, RR, RG and RB of the first substrate 110 and the electrode patterns EP and the barrier patterns BP of the second substrate 120, the electrode patterns EP and the barrier patterns BP will be exemplarily described with reference to FIGS. 2-3. As exemplarily shown in FIGS. 2-3, the electrode patterns EP may be disposed to face the first to sixth pixel electrodes PE1 to PE6, and thus, an electric field can be generated therebetween. Each of the barrier patterns BP may be interposed between two adjacent pixels in the first direction D1, as illustrated in FIG. 2, thereby preventing or substantially minimizing propagation of light between adjacent pixels in the first direction D1.

In detail, as shown in FIG. 2, two pixels of the first to sixth pixels LR, LG, LB, RR, RG, and RB, which are adjacent to each other in the second direction D2, may be configured to realize two different colors. Two pixels of the first to sixth pixels LR, LG, LB, RR, RG, and RB, which are adjacent to each other in the first direction D1, may be configured to realize the same color but transmit light to two different positions, i.e., two positions corresponding to respective right and left eyes. Therefore, each of the barrier patterns BP may be interposed to prevent or substantially minimize propagation of light between adjacent pixels that emit the same color but transmit light to different positions, e.g., to different eyes.

Furthermore, each of the first to sixth pixels LR, LG, LB, RR, RG, and RB may be configured in such a way that sides thereof along the first direction D1 may be longer than sides thereof along the second direction D2. In other words, for the first to sixth pixels LR, LG, LB, RR, RG, and RB, a first directional width along the first direction D1 may be greater than a second directional width measured along the second direction D2. In some embodiments, as shown in FIG. 2, the barrier patterns BP may be disposed to extend along the second direction D2. That is, the barrier patterns BP may extend in parallel to the second directional width of the pixels.

Although not depicted in the drawings, the electrode patterns EP may be connected to the first to third storage lines SL1 to SL3 in the non-display area PA. For instance, each of the first to third storage lines SL1 to SL3 may be connected to the corresponding one of the electrode patterns EP, and the same signal may be delivered to the storage line and the electrode pattern connected to each other. In some embodiments, the first to third storage lines SL1 to SL3 may be disposed to be parallel to the electrode patterns EP, as shown in FIG. 2, thereby facilitating such connections between the storage lines and the electrode patterns.

Hereinafter, a method of detecting an external touch event will be described with reference to FIGS. 4A, 4B, 5A, and 5B.

Figure 4A:
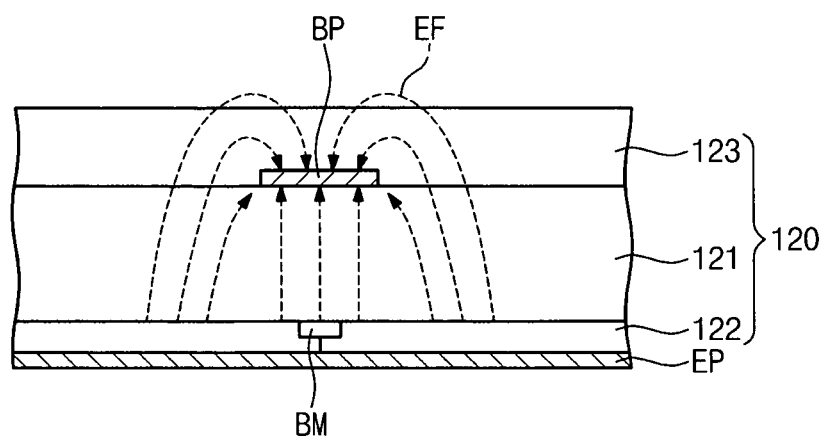
FIG. 4A illustrates an enlarged sectional view of a portion of the second substrate shown in FIG. 3.
Figure 4B:
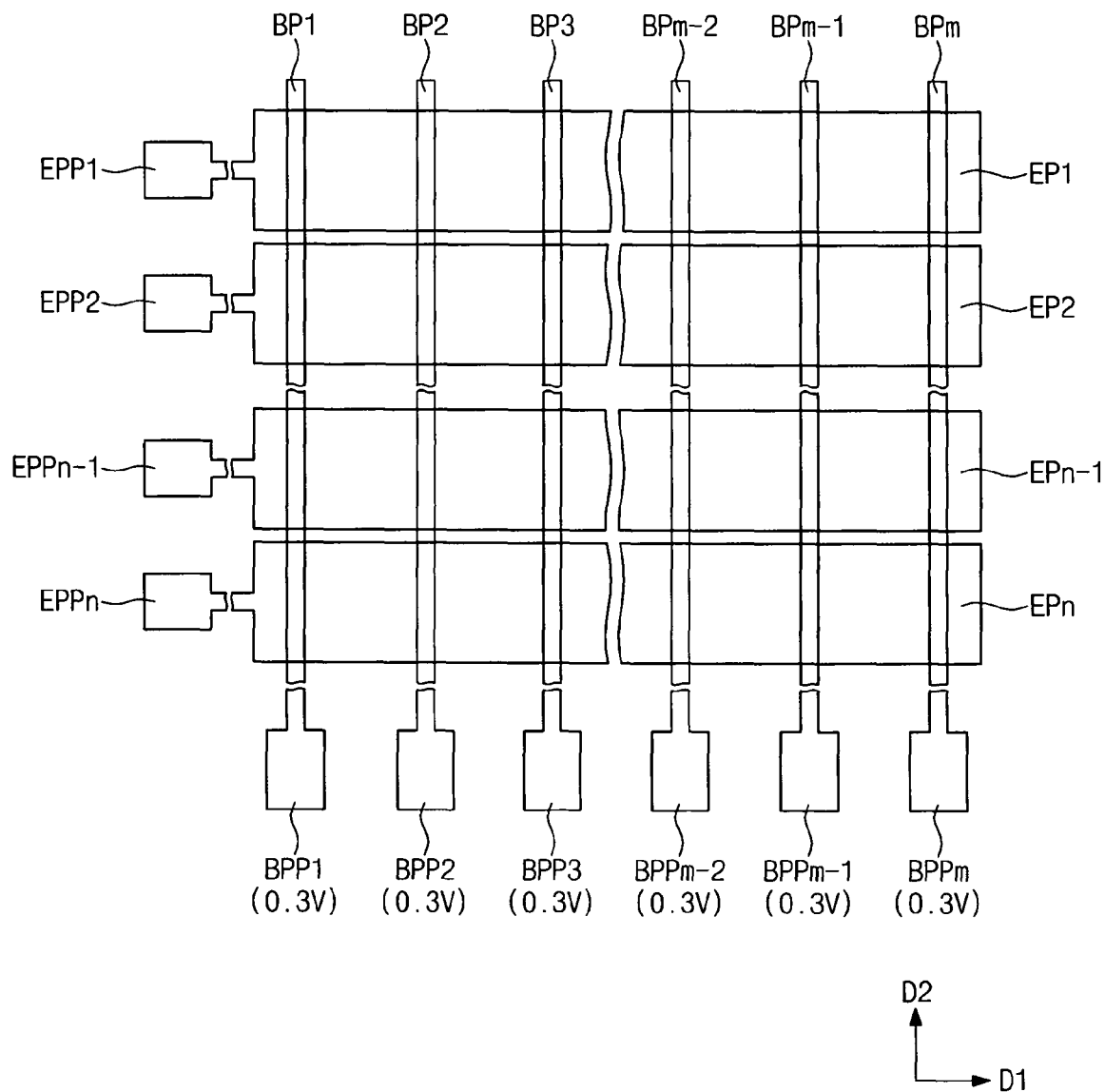
FIG. 4B illustrates an enlarged partial plan view of the barrier patterns and the electrode patterns shown in FIG. 1.

FIG. 4A is an enlarged sectional view of a portion of the second substrate 120 shown in FIG. 3, and FIG. 4B is a plan view of the barrier patterns and the electrode patterns.

In more detail, FIG. 4A shows an electric field EF generated between one of the electrode patterns EP and one of the barrier patterns BP when no external touch event occurs, i.e., when no external objects touch the second substrate 120.

Referring to FIG. 4A, when a sensing signal is applied to the electrode pattern EP, the electric field EF generated by the sensing signal may induce voltage in the barrier pattern BP. For instance, when no external touch event is exerted on the second substrate 120, applying repeatedly and alternately sensing signals of 3V and 0V to the electrode pattern EP may induce voltage of about 0.3V in the barrier pattern BP.

Referring to FIG. 4B, the electrode patterns EP may include first to n-th electrode patterns EP1 to EPn (n is one of natural numbers) extending along the first direction D1 and arranged along the second direction D2. The barrier patterns BP may include first to m-th barrier pattern BP1 to BPm (m is one of natural numbers) extending along the second direction D2 and arranged along the first direction D1.

The display apparatus 100 may include first to n-th electrode pattern pads EPP1 to EPPn connected to the first to n-th electrode pattern EP1 to EPn in the non-display area (PA in FIG. 1) and first to m-th barrier pattern pads BPP1 to BPPm connected to the first to m-th barrier patterns BP1 to BPm in the non-display area (PA in FIG. 1). In some embodiments, the first to n-th electrode pattern pads EPP1 to EPPn may be used as pathways transmitting the sensing signals and the first to m-th barrier pattern pads BPP1 to BPPm may be used to detect voltages of the first to m-th barrier patterns BP1 to BPm.

In some embodiments, the display apparatus 100 may be configured to apply the sensing signals sequentially to the first to n-th electrode patterns EP1 to EPn and to measure voltages of the first to m-th barrier patterns BP1 to BPm synchronously with the sensing signals. The measurement of the voltages at the barrier patterns may determine whether an external touch event exerted on the second substrate 120 happens or not.

In detail, as described with reference to FIGS. 4A-4B, when no external touch event exerted on the second substrate 120 occurs, the first to m-th barrier patterns BP1 to BPm may have the same voltage, i.e., the barrier pattern pads BPP1 to BPPm may measure a same voltage of about 0.3V at the barrier patterns BP1 to the BPm. When one of the first to m-th barrier pattern pads BPP1 to BPPm measures a voltage value not corresponding to the remaining barrier pattern pads, a determination of a touch even may occur, as will be described in detail below with reference to FIGS. 5A-5B.

Figure 5A:
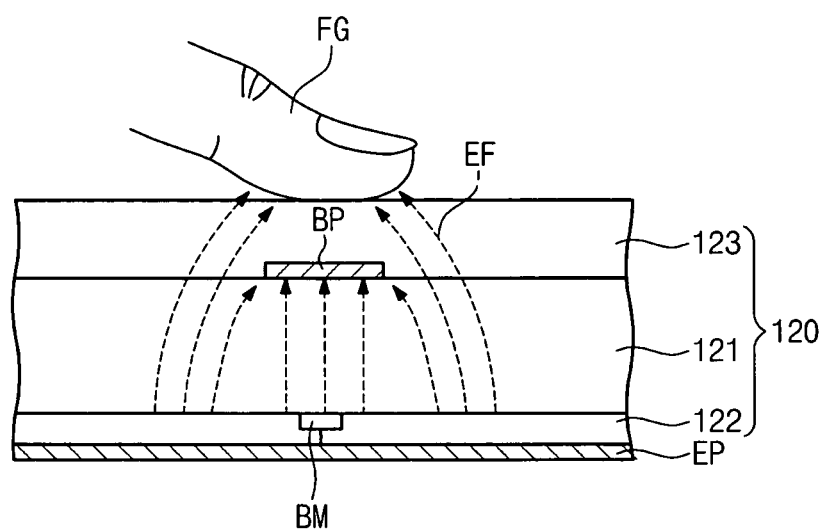
FIG. 5A illustrates an enlarged sectional view of a portion of the second substrate in the presence of an external touch event.
Figure 5B:
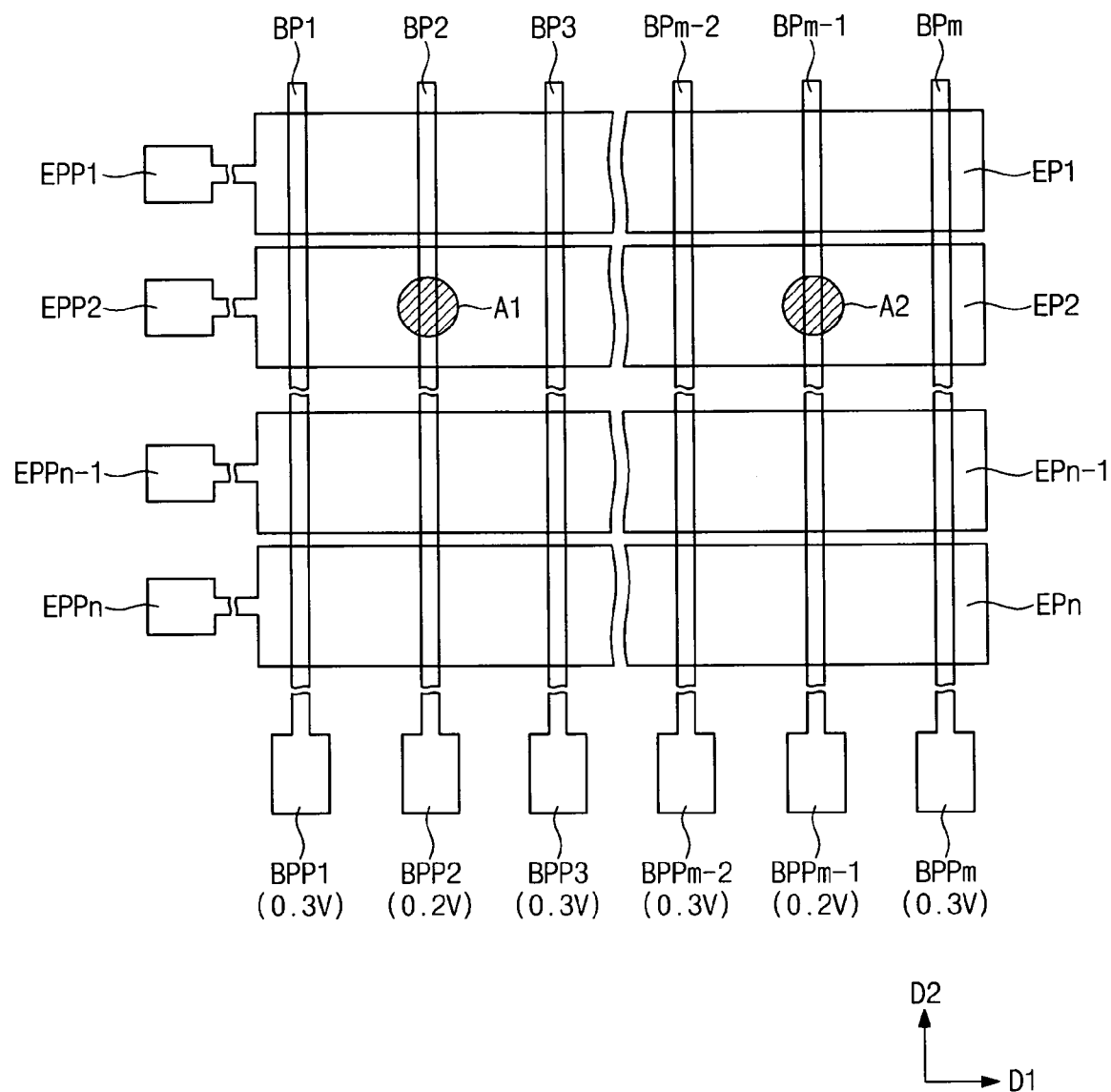
FIG. 5B illustrates an enlarged partial plan view of the barrier patterns and the electrode patterns in the presence of an external touch event.

FIG. 5A is an enlarged sectional view illustrating a portion of the second substrate 120 when an external touch event occurs, and FIG. 5B is a plan view of the barrier patterns and the electrode patterns when an external touch event occurs. In detail, FIG. 5A shows an electric field EF generated between one of the electrode patterns EP and one of the barrier patterns BP when an external touch event exerted on the second substrate 120 occurs.

Referring to FIG. 5A, a sensing signal applied to the electrode pattern EP generates an electric field EF around the barrier pattern BP to induce voltage in the barrier pattern BP, as described with reference to FIG. 4A. When a touch event occurs by an external object, e.g., when a finger FG touches the second substrate 120, the induced voltage applied to the barrier pattern BP changes, i.e., relatively to the induced voltage in the barrier pattern BP without a touch event. That is, an electric potential of the finger FG, which may be in a ground state, disturbs the electric field EF generated by the sensing signal, as shown in FIG. 5A, and thus, induces a different voltage value in the barrier pattern BP, as compared with the case of FIG. 4A. For example, in the presence of a touch event on the second substrate 120 exerted by the finger FG, applying repeatedly and alternately the sensing signals of 3V and 0V to the electrode pattern EP may induce a voltage of about 0.2V in the barrier pattern BP.

Referring to FIG. 5B, if external touch events on the second substrate 120 exerted by the finger FG occur at a first region A1, i.e., where the second electrode pattern EP2 intersects the second barrier pattern BP2, and at a second region A2, i.e., where the second electrode pattern EP2 intersects the (m−1)-th barrier pattern BPm-1, a voltage of about 0.2 V may be measured from the second barrier pattern BP2 and the (m−1)-th barrier pattern BPm-1 in response to the sensing signals applied to the second electrode pattern EP2, and a voltage of about 0.3 V may be measured from other barrier patterns with the exception of the second barrier pattern BP2 and the (m−1)-th barrier pattern BPm-1. This measurement may determine whether one or more external touch events occur at one or more positions of the second substrate 120.

Figure 6:
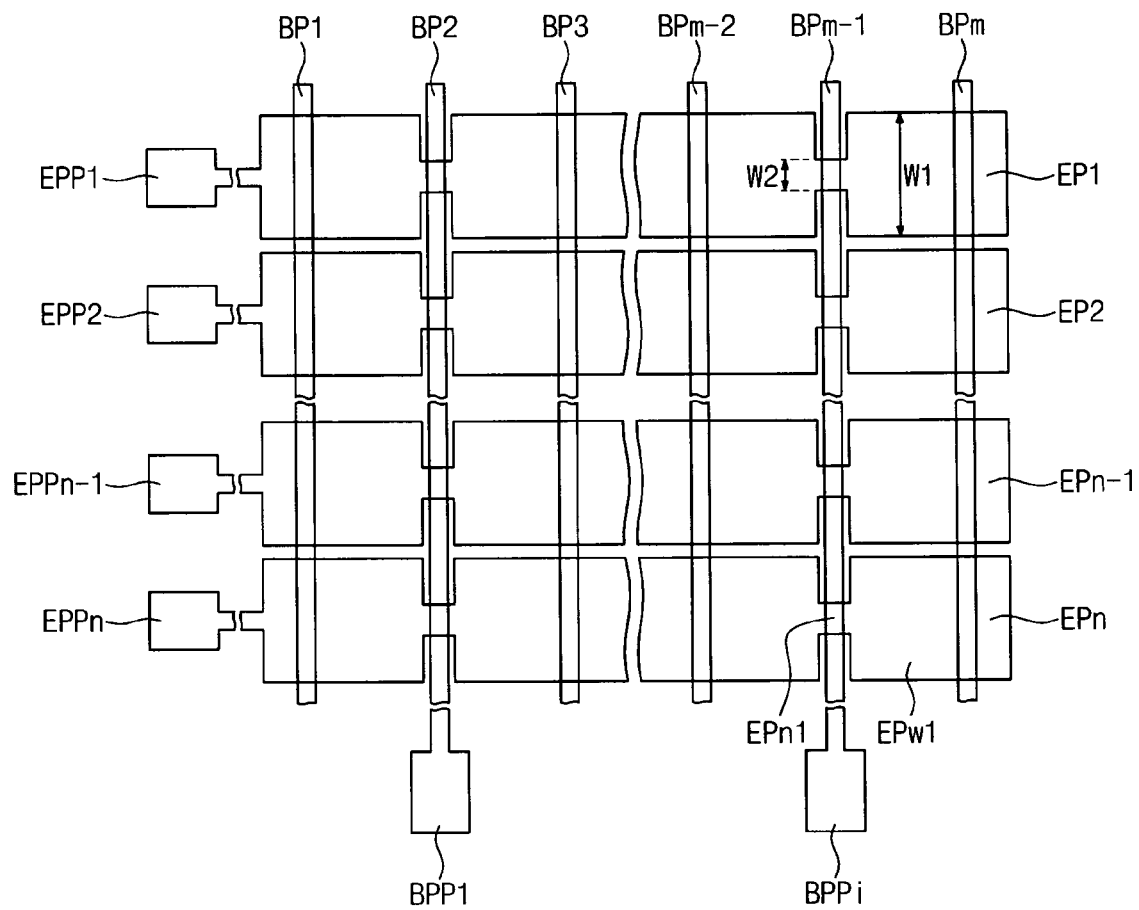
FIG. 6 illustrates a plan view of barrier and electrode patterns according to other example embodiments.

FIG. 6 is an enlarged plan view of barrier and electrode patterns according to other example embodiments of the inventive concepts. Referring to FIG. 6, the electrode patterns EP may include first to n-th electrode patterns EP 1 to EPn extending along the first direction D1 and arranged along the second direction D2, and the barrier patterns BP may include first to m-th barrier pattern BP1 to BPm extending along the second direction D2 and arranged along the first direction D1.

The display apparatus 100 may include first to n-th electrode pattern pads EPP1 to EPPn connected to the first to n-th electrode patterns EP1 to EPn in the non-display area (PA in FIG. 1) and first to i-th barrier pattern pads BPP1 to BPPi (i is one of natural numbers) connected to a portion of the first to m-th barrier patterns BP1 to BPm in the non-display area (PA in FIG. 1). In some embodiments, the first to n-th electrode pattern pads EPP1 to EPPn may be used as pathways transmitting the sensing signals, and the first to i-th barrier pattern pads BPP1 to BPPi may be used to measure voltages of the portion of the first to m-th barrier patterns BP1 to BPm. For instance, as shown in FIG. 6, the second and (m−1)-th barrier patterns BP2 and BPm-1 may be connected to the first to i-th barrier pattern pads BPP1 to BPPi used to measure voltages of the second and (m−1)-th barrier patterns BP2 and BPm-1, while the first, third, (m−2)-th, and m-th barrier pattern BP1, BP3, and BPm-2, and BPm may not be connected to the barrier pattern pads.

In some embodiments, although the first to m-th barrier patterns BP1 to BPm may be interposed between every two substantially adjacent pixels to realize a stereoscopic image, an external touch event exerted on the second substrate 120 may be perceived using a portion of the first to m-th barrier patterns BP1 to BPm. In this sense, the barrier pattern pads may be merely connected to some of the barrier patterns that are used to perceive an external touch event, as shown in FIG. 6.

As shown in FIG. 6, each of the first to n-th electrode patterns EP1 to EPn may have wide portions EPw1 having a first width W1 and narrow portions EPn1 having a second width W2 smaller than the first width W1. In some embodiments, the narrow portions EPn1 may be positioned on the barrier patterns connected with the barrier pattern pad, while the remaining portions of the first to n-th electrode patterns EP1 to EPn may be the wide portions EPw1. That is, a narrow portion EPn1 may connect two adjacent wide portions EPw1 along the first direction D1, and may overlap a barrier pattern PB between the two adjacent wide portions EPw1.

Due to the narrow portion EPn1 shown in FIG. 6, an electric field generated between the narrow portion EPn1 and the barrier pattern BP may be confined to a reduced region, as compared with the case of the wide portion. This may enable to perceive an external touch event with improved sensitivity.

Figure 7:
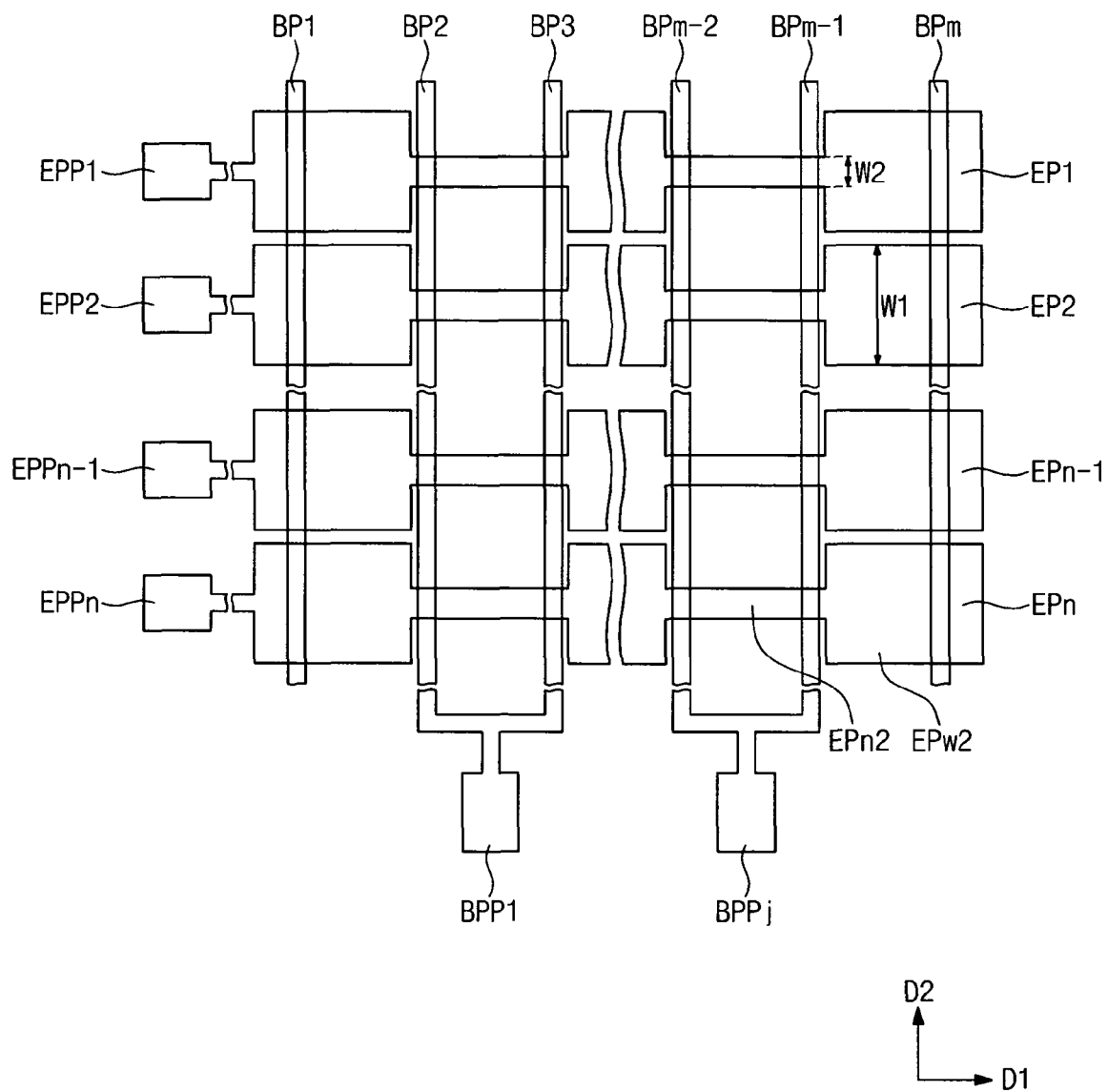
FIG. 7 illustrates a plan view of barrier and electrode patterns according to still other example embodiments.

FIG. 7 is an enlarged plan view of barrier and electrode patterns according to still other example embodiments of the inventive concepts. Referring to FIG. 7, the electrode patterns EP may include first to n-th electrode patterns EP1 to EPn extending along the first direction D1 and arranged along the second direction D2, and the barrier patterns BP may include first to m-th barrier pattern BP1 to BPm extending along the second direction D2 and arranged along the first direction D1.

The display apparatus 100 may include first to n-th electrode pattern pads EPP1 to EPPn and first to j-th barrier pattern pads BPP1 to BPPj (j is one of natural numbers). The first to n-th electrode pattern pads EPP1 to EPPn may be connected to the first to n-th electrode patterns EP1 to EPn, respectively, in the non-display area (PA in FIG. 1), and each of the first to j-th barrier pattern pads BPP1 to BPPj may be connected to at least two of the first to m-th barrier patterns BP1 to BPm in the non-display area (PA in FIG. 1). In some embodiments, the first to n-th electrode pattern pads EPP1 to EPPn may be used as pathways transmitting the sensing signals, and the first to j-th barrier pattern pads BPP1 to BPPj may be used to measure voltages thereof. For instance, as shown in FIG. 7, the second and third barrier patterns BP2 and BP3 may be connected in common to a first barrier pattern pad BPP1 in common, and the (m−2)-th and (m−1)-th barrier patterns BPm-2 and BPm-1 may be connected in common to a j-th barrier pattern pad BPPj, while the first and m-th barrier patterns BP1 and BPm may not be connected to the barrier pattern pads.

As shown in FIG. 7, each of the first to n-th electrode patterns EP1 to EPn may have wide portions EPw2 having a first width W1 and narrow portions EPn2 having a second width W2 smaller than the first width W1. In some embodiments, the narrow portions EPn2 may be positioned on the barrier patterns BP connected with the barrier pattern pad BPP, while the remaining portions of the first to n-th electrode patterns EP1 to EPn may be the wide portions EPw2. It is noted that the narrow portions EPn2 in FIG. 7 are longer along the first direction D1 than the narrow portions EPn2 in FIG. 6, i.e., each narrow portion EPn2 extends to overlap two barrier patterns BP connected to a same barrier pattern pad BPP.

Figure 8:
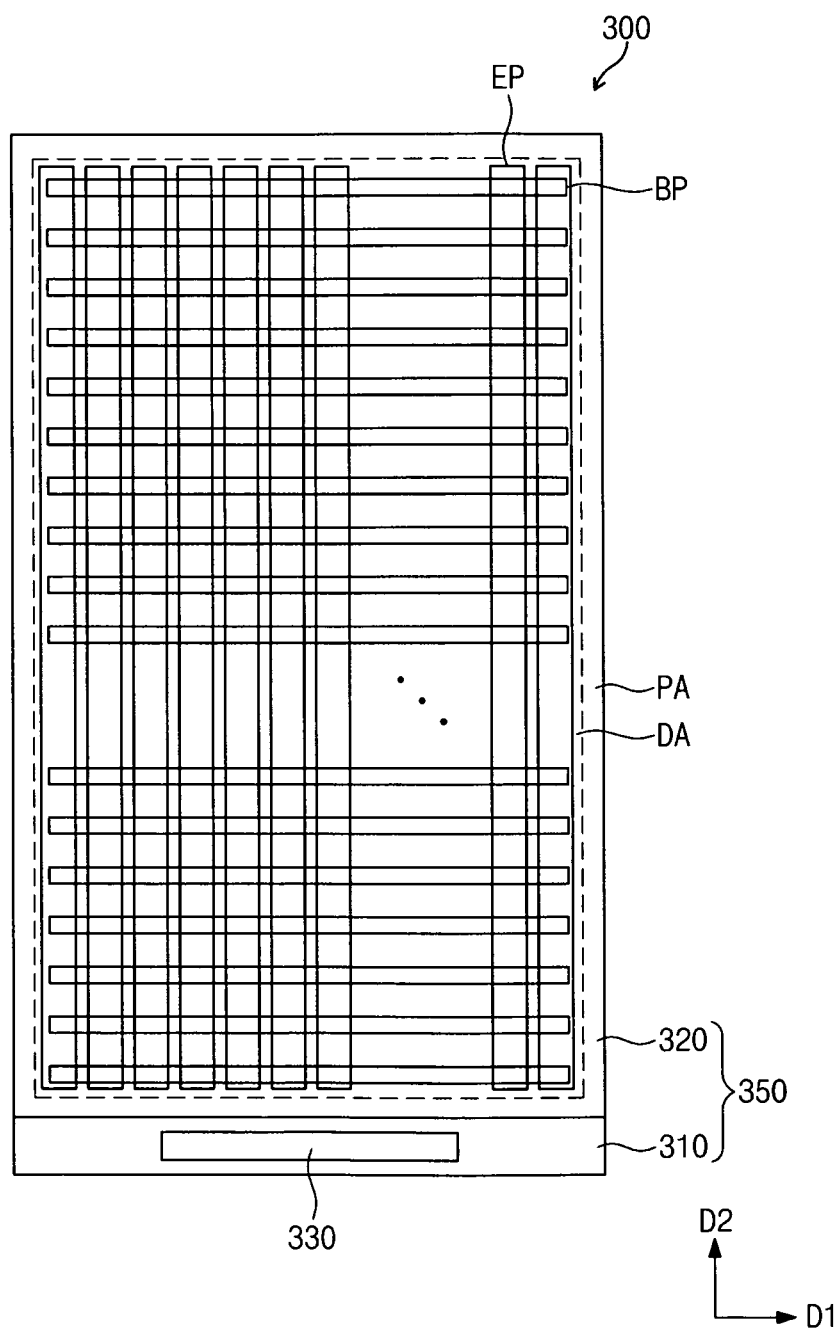
FIG. 8 illustrates a plan view of a display apparatus according to other example embodiments.

FIG. 8 is a plan view of a display apparatus according to other example embodiments of the inventive concepts. Referring to FIG. 8, a display apparatus 300 may include a display panel 350 and a driving circuit 330 configured to provide a driving signal to the display panel 350. The display panel 350 may include a first substrate 310 and a second substrate 320 opposite the first substrate 310. Although not depicted in FIG. 8, a liquid crystal layer may be interposed between the first substrate 310 and the second substrate 320.

The first substrate 310 may be divided into a display area DA provided with a plurality of pixels (not shown) and a non-display area PA provided with the driving circuit 330 or signal lines (not shown). The display area DA may be used to display an image. As shown in FIG. 8, the first substrate 310 may have an area greater than the second substrate 320 so that the driving circuit 330 can be mounted on the first substrate 310.

There may be a plurality of electrode patterns EP and a plurality of barrier patterns BP in the second substrate 320. The barrier patterns BP may extend along the first direction D1 to be arranged along the second direction D2, and the electrode patterns EP may extend along the second direction D2 to be arranged along the first direction D1. In addition, the barrier patterns BP may be electrically isolated from the electrode patterns EP. According to example embodiments, the barrier patterns BP may enable a viewer to perceive a stereoscopic image. In some embodiments, the barrier patterns BP may be configured to allow each eye to see a different group of the pixels. For instance, due to the presence of the barrier patterns BP, lights emitted from a group of the pixels may be delivered to a left eye of a viewer located at a specific external position and lights emitted from another group of the pixels may be delivered to a right eye of the viewer.

In addition, the electrode patterns EP and the barrier patterns BP may be configured to detect an external touch event on the display area DA. In some embodiments, the barrier patterns BP may include at least one of a conductive material or a material capable of absorbing or shielding a light.

The driving circuit 330 may be disposed in a portion of the non-display area PA of the first substrate 310 not facing the second substrate 320. The driving circuit 330 may be directly formed on the first substrate 310 using a deposition process. Alternatively, the driving circuit 330 may be provided in a chip-on-glass manner.

Although not depicted in FIG. 8, the driving circuit 330 may include a gate driver providing a gate signal to a gate line and a data driver providing a data signal to a data line. The driving circuit 330 may be configured to apply a reference voltage or sensing signals to the electrode patterns EP or to measure voltages of the barrier patterns BP.

Figure 9:
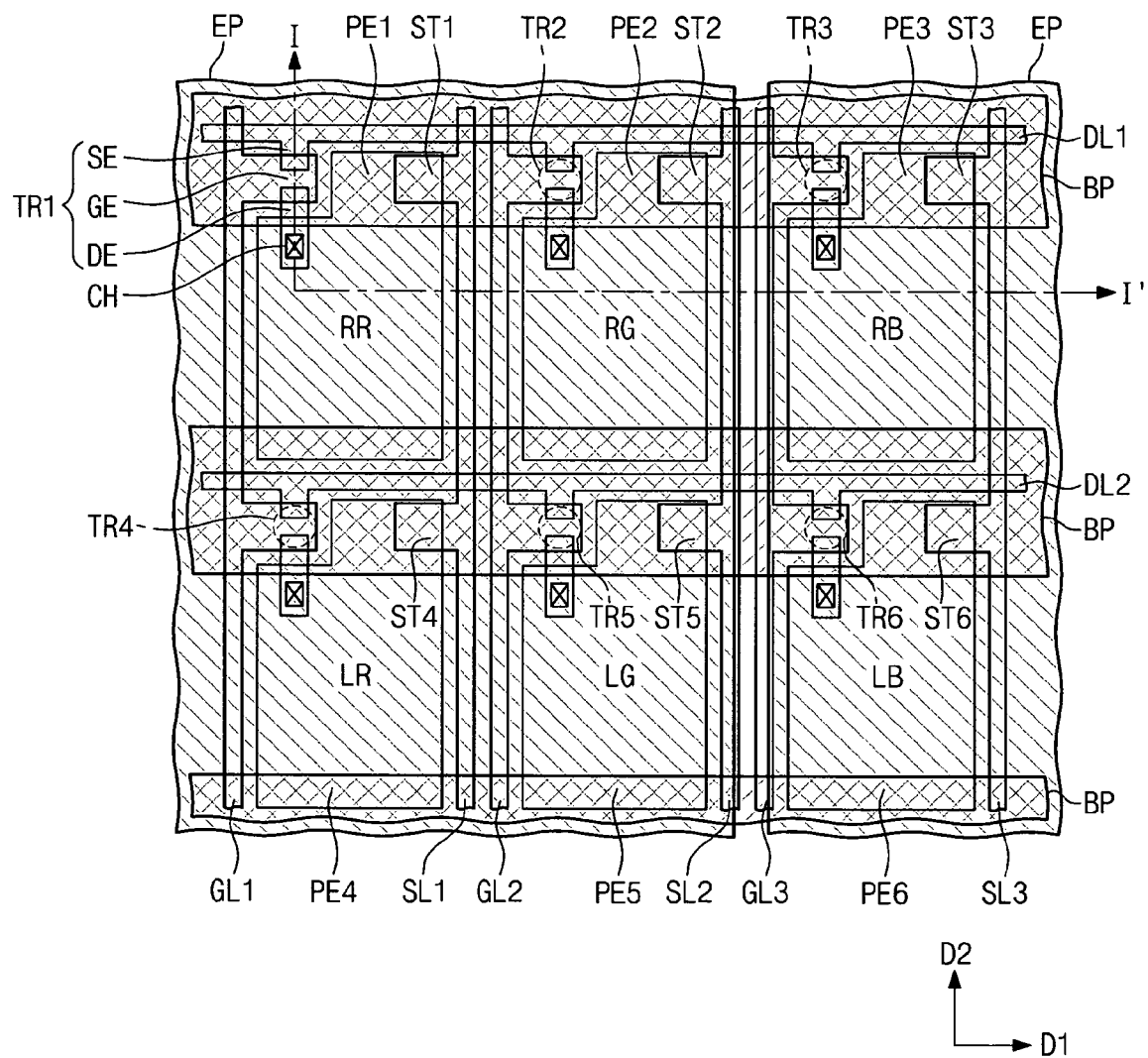
FIG. 9 illustrates an enlarged partial plan view of the display apparatus in FIG. 8.
Figure 10:
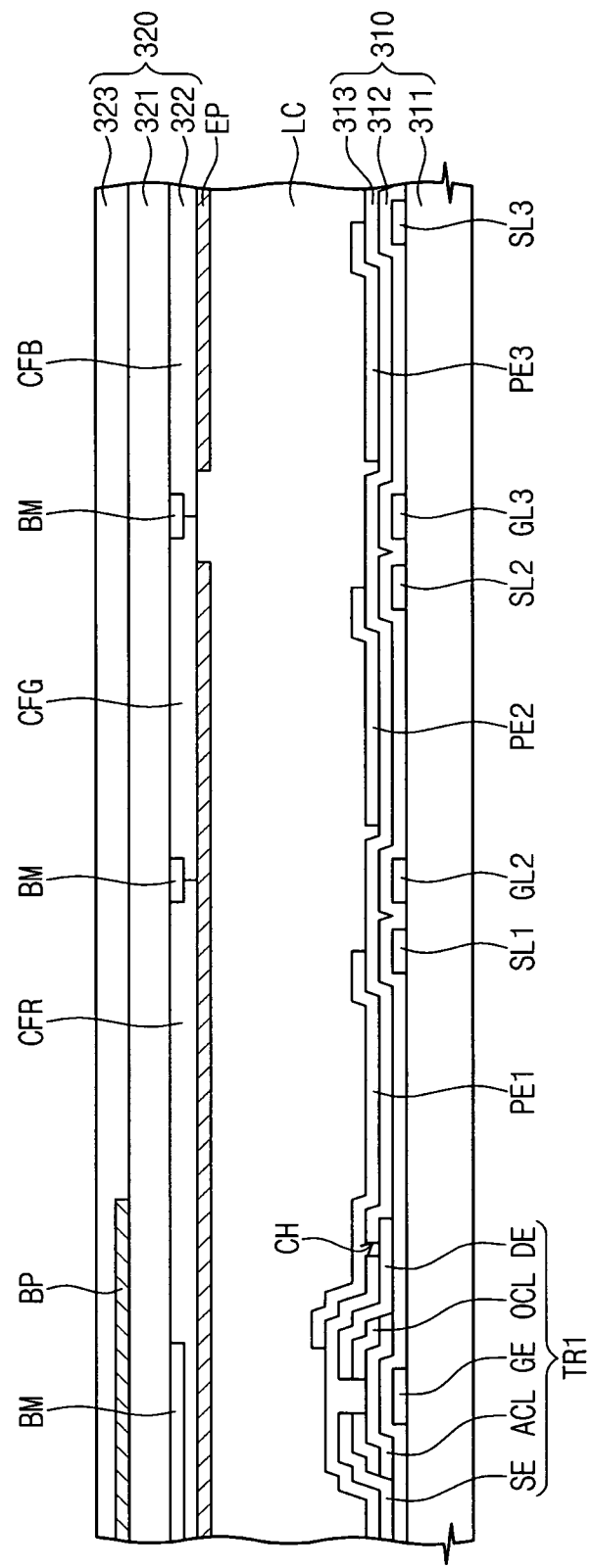
FIG. 10 illustrates a sectional view taken along a line I-I' of FIG. 9.

FIG. 9 is an enlarged plan view of the display apparatus shown in FIG. 8, and FIG. 10 is a sectional view taken along a line I-I' of FIG. 9. In more detail, FIG. 9 shows an exemplary enlarged view of six pixel regions that correspond to a portion of the pixels described with reference to FIG. 8.

Referring to FIG. 9, the display apparatus 300 may include first and second data lines DL1 and DL2, which may extend along the first direction D1 and be separated from each other, first to third gate lines GL1 to GL3, which may extend along the second direction D2 to cross the first and second data lines DL1 and DL2 and be separated from each other, and first to sixth thin-film transistors TR1 to TR6, which may be connected to the first and second data lines DL1 and DL2 and the first to third gate lines GL1 to GL3 to serve as switching devices.

Each of the first to sixth thin-film transistors TR1 to TR6 may be connected to a corresponding one of the first to third gate lines GL1 to GL3 and to a corresponding one of the first and second data lines DL1 and DL2. In more detail, the first thin-film transistor TR1 may be connected to the first gate line GL1 and the first data line DL1, the second thin-film transistor TR2 may be connected to the second gate line GL2 and the first data line DL1, the third thin-film transistor TR3 may be connected to the third gate line GL3 and the first data line DL1, the fourth thin-film transistor TR4 may be connected to the first gate line GL1 and the second data line DL2, the fifth thin-film transistor TR5 may be connected to the second gate line GL2 and the second data line DL2, and the sixth thin-film transistor TR6 may be connected to the third gate line GL3 and the second data line DL2. Each of the first to sixth thin-film transistors TR1 to TR6 may include a gate electrode GE extending from a corresponding gate line, a source electrode SE extending from a corresponding data line, and a drain electrode DE separated from the source electrode SE.

The display apparatus 300 may further include first to sixth pixel electrodes PE1 to PE6, which may be connected to respective drain electrodes DE of the first to sixth thin-film transistors TR1 to TR6 through contact holes CH.

The display apparatus 300 may further include first to third storage lines SL1 to SL3, which may extend along the second direction D2 and be spaced apart from the first to third gate lines GL1 to GL3. The display apparatus 300 may further include first and fourth storage electrodes ST1 and ST4 extending from the first storage line SL1, second and fifth storage electrodes ST2 and ST5 extending from the second storage line SL2, and third and sixth storage electrodes ST3 and ST6 extending from the third storage line SL3. The first to sixth storage electrodes ST1 to ST6 may be disposed to face the first to sixth pixel electrodes PE1 to PE6, respectively, thereby forming storage capacitors.

Referring to FIGS. 9 and 10, the display apparatus 300 may include the first substrate 310, the second substrate 320, and a liquid crystal layer LC interposed between the first and second substrates 310 and 320.

The first substrate 310 may include a first base substrate 311, a gate electrode GE disposed on the first base substrate 311, second and third gate lines GL2 and GL3, and the first to second storage line SL1 to SL3. In addition, a first insulating layer 312 may be disposed on the gate electrode GE, the second and third gate lines GL2 and GL3, the first to second storage line SL1 to SL3, and the first base substrate 311.

An active layer ACL and an ohmic contact layer OCL may be disposed on a portion of the first insulating layer 312 adjacent the gate electrode GE. A source electrode SE and a drain electrode DE spaced apart from each other may be disposed on the ohmic contact layer OCL and the first insulating layer 312.

A second insulating layer 313 may be disposed on the source electrode SE, the drain electrode DE, and the first insulating layer 312. The first to sixth pixel electrodes PE1 to PE6 may be disposed on the second insulating layer 313. The second insulating layer 313 may be formed to define the contact holes CH, each of which exposes at least a portion of the drain electrode DE. The first pixel electrode PE1 may be connected to the drain electrode DE of the first thin-film transistor TR1 through the contact hole CH.

The second substrate 320 may include a second base substrate 321, a black matrix BM disposed on the second base substrate 321, a color filter layer 322 disposed on the black matrix BM and the second base substrate 321.

The color filter layer 322 may include a red color filter CFR realizing red color, a green color filter CFG realizing green color, and a blue color filter CFB realizing blue color. The electrode patterns EP may be disposed on the color filter layer 322.

The second substrate 320 may include the barrier patterns BP, which may be disposed on the second base substrate 321 to face the electrode patterns EP. The second substrate 320 may include a polarizing plate 323 disposed on the barrier patterns BP.

Referring back to FIG. 9, the first data line DL1, the first gate line GL1, the first thin-film transistor TR1, and the first pixel electrode PE1 may constitute a first pixel RR configured to emit a red light. The first data line DL1, the second gate line GL2, the second thin-film transistor TR2, and the second pixel electrode PE2 may constitute a second pixel RG configured to emit a green light. The first data line DL1, the third gate line GL3, the third thin-film transistor TR3, and the third pixel electrode PE3 may constitute a third pixel RB configured to emit a blue light. In other words, the first, second, and third pixels RR, RG, and RB may be red, green, and blue pixels, respectively.

Similarly, the second data line DL2, the first gate line GL1, the fourth thin-film transistor TR4, and the fourth pixel electrode PE4 may constitute a fourth pixel LR configured to emit a red light. The second data line DL2, the second gate line GL2, the fifth thin-film transistor TR5, and the fifth pixel electrode PE5 may constitute a fifth pixel LG configured to emit a green light. The second data line DL2, the third gate line GL3, the sixth thin-film transistor TR6, and the sixth pixel electrode PE6 may constitute a sixth pixel LB configured to emit a blue light. In other words, the fourth, fifth, and sixth pixels LR, LG, and LB may be red, green, and blue pixels, respectively.

Depending on positions and/or arrangements of the barrier patterns BP, lights emitted from the first to third pixels RR, RG, and RB may be transmitted to a first position located outside the display apparatus 300, and lights emitted from the fourth to sixth pixel LR, LG, and LB may be transmitted to a second position located outside the display apparatus 300. In more detail, the display apparatus 300 may be configured in such a way that the first and second positions correspond to both eyes, respectively, of a viewer located at a specific position outside the display apparatus 300. This enables the viewer to perceive a stereoscopic image.

To provide better understanding of a relative arrangement between the first to sixth pixels RR, RG, RB, LR, LG, and LB of the first substrate 310 and the electrode patterns EP and the barrier patterns BP of the second substrate 320, the electrode patterns EP and the barrier patterns BP will be exemplarily described with reference to FIG. 9. As exemplarily shown in FIG. 9, the electrode patterns EP may be disposed to face the first to sixth pixel electrodes PE1 to PE6, and thus, an electric field can be generated therebetween. Each of the barrier patterns BP may be interposed between two adjacent pixels in the second direction D2 to confine propagation directions of lights emitted from the first to sixth pixels RR, RG, RB, LR, LG, and LB.

In some embodiments, as shown in FIG. 9, two pixels of the first to sixth pixels RR, RG, RB, LR, LG, and LB, which are adjacent to each other in the first direction D1, may be configured to realize two different colors, while two pixels of the first to sixth pixels RR, RG, RB, LR, LG, and LB, which are adjacent to each other in the second direction D2, may be configured to realize the same color. But example embodiments of the inventive concepts may not be limited thereto.

Furthermore, each of the first to sixth pixels RR, RG, RB, LR, LG, and LB may be configured in such a way that sides thereof parallel to the second direction D2 are longer than sides thereof parallel to the first direction D1. In other words, for the first to sixth pixels RR, RG, RB, LR, LG, and LB, a second directional width may be greater than a first directional width measured along the second direction D2. In some embodiments, as shown in FIG. 9, the barrier patterns BP may be disposed to extend along the first direction D1. That is, the barrier patterns BP may have running directions parallel to the first direction D1.

Although not depicted in the drawings, the electrode patterns EP may be connected to the first to third storage lines SL1 to SL3 in the non-display area PA. For instance, each of the first to third storage lines SL1 to SL3 may be connected to the corresponding one of the electrode patterns EP, and thus, the same signal may be delivered in common to the storage line and the electrode pattern connected to each other. In some embodiments, the first to third storage lines SL1 to SL3 may be disposed to be parallel to the electrode patterns EP, as shown in FIG. 9, and this may facilitate such connections between the storage line and the electrode pattern.

Figure 11:
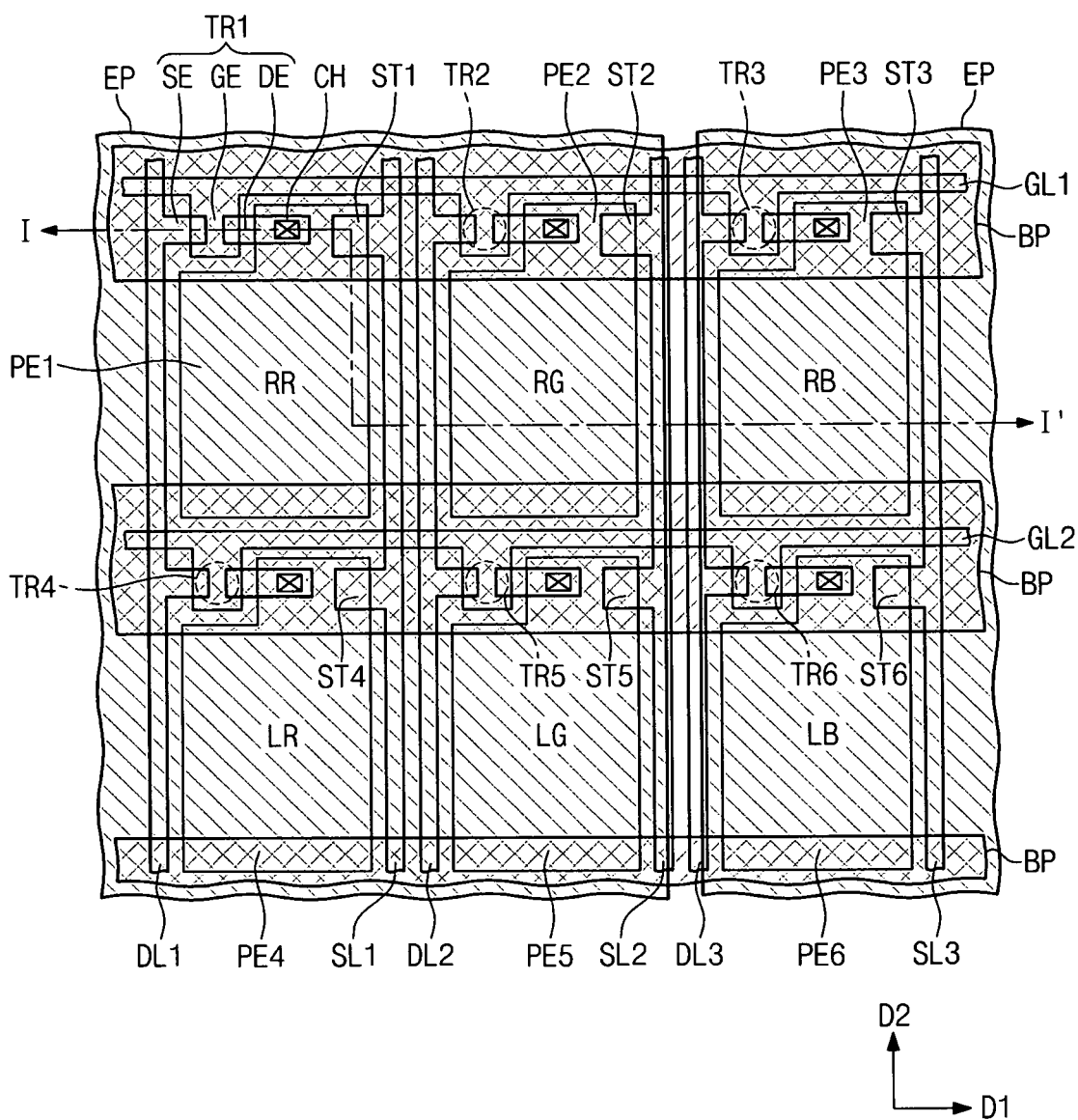
FIG. 11 illustrates an enlarged plan view of a display apparatus according to modifications of embodiments described with reference to FIG. 8.
Figure 12:
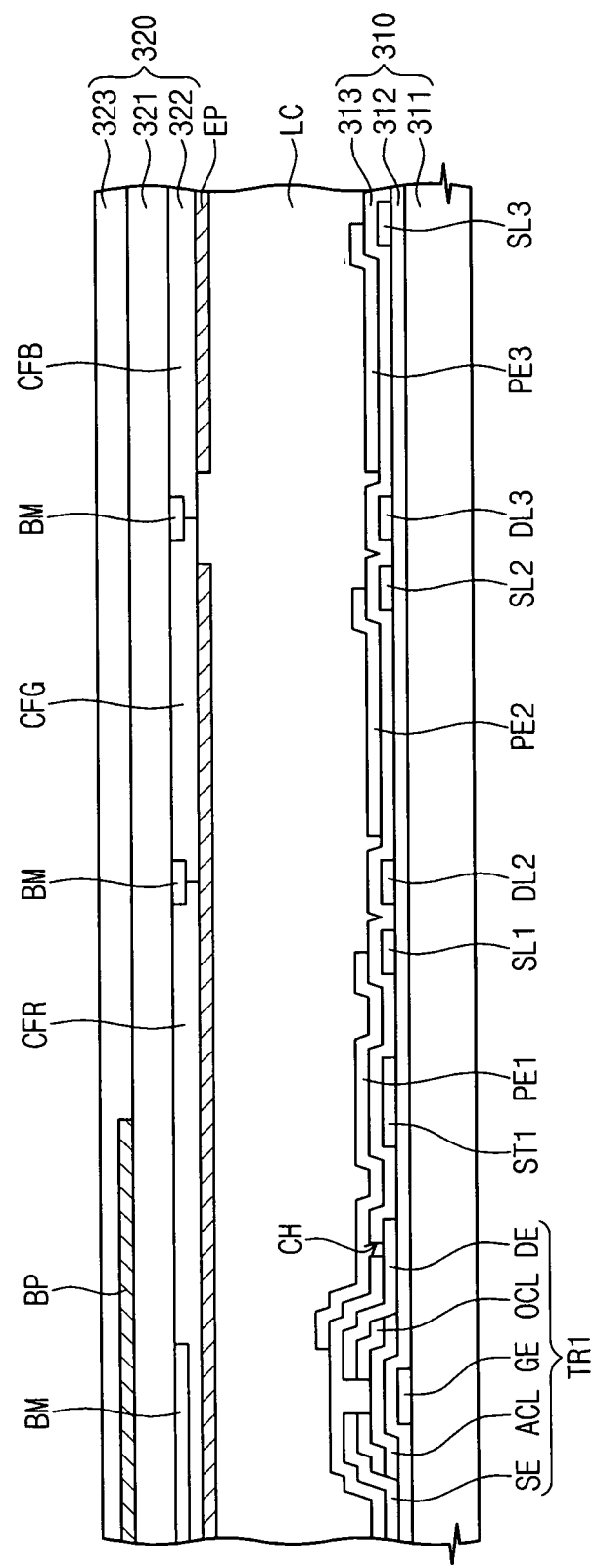
FIG. 12 illustrates a sectional view taken along a line I-I' of FIG. 11.

FIG. 11 is an enlarged plan view of a display apparatus according to modifications of embodiments described with reference to FIG. 8, and FIG. 12 is a sectional view taken along a line I-I' of FIG. 11

Referring to FIG. 11, the display apparatus 300 may include first and second gate lines GL1 and GL2, which may extend along the first direction D1 and be separated from each other, first to third data lines DL1 to DL3, which may extend along the second direction D2 to cross the first and second gate lines GL1 and GL2 and be separated from each other, and first to sixth thin-film transistors TR1 to TR6, which may be connected to the first and second gate lines GL1 and GL2 and the first to third data lines DL1 to DL3 to serve as switching devices.

Each of the first to sixth thin-film transistors TR1 to TR6 may be connected to a corresponding one of the first and second gate lines GL1 and GL2 and a corresponding one of the first to third data lines DL1 to DL3. In more detail, the first thin-film transistor TR1 may be connected to the first gate line GL1 and the first data line DL1, the second thin-film transistor TR2 may be connected to the first gate line GL1 and the second data line DL2, the third thin-film transistor TR3 may be connected to the first gate line GL1 and the third data line DL3, the fourth thin-film transistor TR4 may be connected to the second gate line GL2 and the first data line DL1, the fifth thin-film transistor TR5 may be connected to the second gate line GL2 and the second data line DL2, and the sixth thin-film transistor TR6 may be connected to the second gate line GL2 and the third data line DL3. Each of the first to sixth thin-film transistors TR1 to TR6 may include a gate electrode GE extending from the corresponding gate line, a source electrode SE extending from the corresponding data line, and a drain electrode DE separated from the source electrode SE. The display apparatus 300 may further include first to sixth pixel electrodes PE1 to PE6, which may be connected to corresponding drain electrodes DE of the first to sixth thin-film transistors TR1 to TR6 through contact holes CH.

The display apparatus 300 may further include first to third storage lines SL1 to SL3, which may extend along the second direction D2 and be spaced apart from the first to third data lines DL1 to DL3. The display apparatus 300 may further include first and fourth storage electrodes ST1 and ST4 extending from the first storage line SL1, second and fifth storage electrodes ST2 and ST5 extending from the second storage line SL2, and third and sixth storage electrodes ST3 and ST6 extending from the third storage line SL3. The first to sixth storage electrodes ST1 to ST6 may be disposed to face the first to sixth pixel electrodes PE1 to PE6, respectively, thereby forming storage capacitors.

Referring to FIGS. 11 and 12, the display apparatus 300 may include the first substrate 310, the second substrate 320, and a liquid crystal layer LC interposed between the first and second substrates 310 and 320.

The first substrate 310 may include the first base substrate 311, the gate electrode GE disposed on the first base substrate 311, and the first to third gate lines GL1 to GL3. In addition, the first insulating layer 312 may be disposed on the gate electrode GE, the first to third gate lines GL1 to GL3, and the first base substrate 311.

The active layer ACL and the ohmic contact layer OCL may be disposed on a portion of the first insulating layer 312 to face the gate electrode GE. The source electrode SE and the drain electrode DE spaced apart from each other may be disposed on the ohmic contact layer OCL and the first insulating layer 312. In addition, the first to third data lines DL1 to DL3 and the first to third storage lines SL1 to SL3 may be disposed, spaced apart from each other, on the first insulating layer 312.

The second insulating layer 313 may be disposed on the source electrode SE, the drain electrode DE, the first to third storage lines SL1 to SL3, and the first to third data lines DL1 to DL3. The second insulating layer 313 may be formed to define the contact holes CH, each of which exposes at least a portion of the drain electrode DE. The first pixel electrode PE1 may be connected to the drain electrode DE of the first thin-film transistor TR1 through the contact hole CH.

The second substrate 320 may include the second base substrate 321, the black matrix BM disposed on the second base substrate 321, and the color filter layer 322 disposed on the black matrix BM and the second base substrate 321. The color filter layer 322 may include the red color filter CFR realizing red color, the green color filter CFG realizing green color, and the blue color filter CFB realizing blue color. The electrode patterns EP may be disposed on the color filter layer 322.

The second substrate 320 may include the barrier patterns BP, which may be disposed on the second base substrate 321 to face the electrode patterns EP, e.g., to partially overlap the electrode patterns EP. The second substrate 320 may include the polarizing plate 323 disposed on the barrier patterns BP.

Referring back to FIG. 11, the first data line DL1, the first gate line GL1, the first thin-film transistor TR1, and the first pixel electrode PE1 may constitute the first pixel RR configured to emit a red light. The second data line DL2, the first gate line GL1, the second thin-film transistor TR2, and the second pixel electrode PE2 may constitute the second pixel RG configured to emit a green light. The third data line DL3, the first gate line GL1, the third thin-film transistor TR3, and the third pixel electrode PE3 may constitute the third pixel RB configured to emit a blue light. In other words, the first, second, and third pixels RR, RG, and RB may be red, green, and blue pixels, respectively.

Similarly, the first data line DL1, the second gate line GL2, the fourth thin-film transistor TR4, and the fourth pixel electrode PE4 may constitute the fourth pixel LR configured to emit a red light. The second data line DL2, the second gate line GL2, the fifth thin-film transistor TR5, and the fifth pixel electrode PE5 may constitute the fifth pixel LG configured to emit a green light. The third data line DL3, the second gate line GL2, the sixth thin-film transistor TR6, and the sixth pixel electrode PE6 may constitute the sixth pixel LB configured to emit a blue light. In other words, the fourth, fifth, and sixth pixels LR, LG, and LB may be red, green, and blue pixels, respectively.

Depending on positions and/or arrangements of the barrier patterns BP, lights emitted from the first to third pixels RR, RG and RB may be transmitted to a first position located outside the display apparatus 300, and lights emitted from the fourth to sixth pixel LR, LG and LB may be transmitted to a second position located outside the display apparatus 300. In more detail, the display apparatus 300 may be configured in such a way that the first and second positions correspond to both eyes, respectively, of a viewer located at a specific position outside the display apparatus 300. This enables the viewer to perceive a stereoscopic image.

To provide better understanding of a relative arrangement between the first to sixth pixels RR, RG, RB, LR, LG, and LB of the first substrate 310 and the electrode patterns EP and the barrier patterns BP of the second substrate 320, the electrode patterns EP and the barrier patterns BP will be exemplarily described with reference to FIG. 11. As exemplarily shown in FIG. 11, the electrode patterns EP may be disposed to face the first to sixth pixel electrodes PE1 to PE6, and thus, an electric field can be generated therebetween. Each of the barrier patterns BP may be interposed between two adjacent pixels in the second direction D2 to confine propagation directions of lights emitted from the first to sixth pixels RR, RG, RB, LR, LG, and LB.

In some embodiments, as shown in FIG. 11, two pixels of the first to sixth pixels RR, RG, RB, LR, LG, and LB, which are adjacent to each other in the first direction D1, may be configured to realize two different colors, while two pixels of the first to sixth pixels RR, RG, RB, LR, LG, and LB, which are adjacent to each other in the second direction D2, may be configured to realize the same color. But example embodiments of the inventive concepts may not be limited thereto.

Furthermore, each of the first to sixth pixels RR, RG, RB, LR, LG, and LB may be configured in such a way that sides thereof parallel to the second direction D2 are longer than sides thereof parallel to the first direction D1. In other words, for the first to sixth pixels RR, RG, RB, LR, LG, and LB, a second directional width may be greater than a first directional width measured along the second direction D2. In some embodiments, as shown in FIG. 11, the barrier patterns BP may be disposed to extend along the first direction D1. That is, the barrier patterns BP may have running directions parallel to the first direction D1.

Although not depicted in the drawings, the electrode patterns EP may be connected to the first to third storage lines SL1 to SL3 in the non-display area PA. For instance, each of the first to third storage lines SL1 to SL3 may be connected to the corresponding one of the electrode patterns EP, and thus, the same signal may be delivered in common to the storage line and the electrode pattern connected to each other. In some embodiments, as shown in FIG. 12, the first to third storage lines SL1 to SL3 may be disposed at the same vertical level or layer as the first to third data lines DL1 to DL3. In this case, the first to third storage lines SL1 to SL3 can be disposed to be parallel to the electrode patterns EP.

According to example embodiments of the inventive concepts, a display apparatus may be configured to realize a stereoscopic image using barrier patterns and to detect an external touch event using the barrier patterns and electrode patterns. That is, the barrier patterns and electrode patterns according to example embodiments may be arranged within a display panel with respect to pixels, such that both touch event and realization of a spectroscopic image may be achieved. Accordingly, manufacturing and mounting of a separate touch panel on the display device may not be required. As a result, it may be possible to reduce cost and time to fabricate a display apparatus capable of both realizing a stereoscopic image and perceiving a touch event. In addition, it may be possible to reduce a thickness of the display apparatus.

In contrast, a conventional stereoscopic image display apparatus with a touch panel may include a separate touch panel that is mounted on a display panel using an additional adhesive layer. However, use of such a conventional stereoscopic image display apparatus, i.e., with a separate touch panel, may lead to an increase in cost and time to fabricate the display apparatus, as well as to an increased thickness of the display apparatus.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A display apparatus, comprising:
   a first substrate opposite a second substrate;
   a plurality of electrode patterns in the second substrate, the plurality of electrode patterns extending along a first direction;
   a plurality of barrier patterns in the second substrate, the plurality of barrier patterns being insulated from the electrode patterns and extending along a second direction crossing the first direction; and
   a plurality of pixels, the first and second substrates with the pixels defining a display panel, and each pixel including:
   a gate line extending along a third direction,
   a data line extending along a fourth direction, and
   a pixel electrode electrically connected to the gate line and the data line, the pixel electrode being configured to generate an electric field with a corresponding electrode pattern of the plurality of electrode patterns to display an image,
   wherein the barrier patterns are configured to transmit first and second images to first and second positions located outside the apparatus, respectively, the first and second images being generated from two different groups of pixels to display a stereoscopic image.

2. The apparatus as claimed in claim 1, wherein the first and third directions are parallel to each other, and the second and fourth directions are parallel to each other.

3. The apparatus as claimed in claim 2, wherein each pixel of the plurality of pixels further comprises a storage line spaced apart from the gate line and parallel thereto.

4. The apparatus as claimed in claim 3, wherein the storage line is connected to a corresponding electrode pattern of the plurality of electrode patterns.

5. The apparatus as claimed in claim 4, wherein each pixel of the plurality of pixels further comprises a storage electrode extending from the storage line to face at least a portion of the pixel electrode.

6. The apparatus as claimed in claim 2, wherein each pixel of the plurality of pixels further comprises a color filter overlapping the pixel electrode to realize one of red, green, and blue colors.

7. The apparatus as claimed in claim 6, wherein the plurality of pixels include at least a red pixel configured to display red color, a green pixel configured to display green color, and a blue pixel configured to display blue color, the plurality of pixels being arranged to have every two pixels adjacent to each other in the second direction display different colors.

8. The apparatus as claimed in claim 7, wherein every two pixels adjacent to each other in the first direction display a same color.

9. The apparatus as claimed in claim 2, wherein each pixel of the plurality of pixels has a first width along the first direction and a second width along the second direction, the first width being greater than the second width.

10. The apparatus as claimed in claim 1, wherein the barrier patterns include at least one conductive material capable of absorbing or shielding a light, the electrode patterns being between the first substrate and the barrier patterns.

11. The apparatus as claimed in claim 1, further comprising a driving circuit configured to provide a driving signal to the gate line, to the data line, and to the electrode patterns, the display panel further comprising a display area with the pixels and a non-display area, and the driving circuit being disposed in a portion of the non-display area adjacent to the display area in the second direction.

12. The apparatus as claimed in claim 1, further comprising a driving circuit configured to provide a driving signal to the gate line, to the data line, and to the electrode patterns, the display panel further comprising a display area with the pixels and a non-display area, and the driving circuit being disposed in a portion of the non-display area adjacent to the display area in the first direction.

13. The apparatus as claimed in claim 1, wherein the electrode patterns and the barrier patterns are disposed in the second substrate to face the first substrate, the electrode patterns being interposed between the first substrate and the barrier patterns.

14. The apparatus as claimed in claim 13, further comprising a liquid crystal layer interposed between the first substrate and the second substrate.

15. The apparatus as claimed in claim 1, wherein each pixel of the plurality of pixels further comprises a switching device including a gate electrode extending from the gate line, a source electrode extending from the data line, and a drain electrode connected to the pixel electrode.

16. The apparatus as claimed in claim 1, wherein the barrier patterns include at least one conductive material capable of absorbing or shielding a light.

17. The apparatus as claimed in claim 1, wherein the first and fourth directions are parallel to each other, and the second and third directions are parallel to each other.

18. The apparatus as claimed in claim 17, further comprising a storage line spaced apart from the data line and parallel thereto.

19. The apparatus as claimed in claim 18, wherein the storage line is connected to a corresponding electrode pattern of the plurality of electrode patterns.

20. The apparatus as claimed in claim 17, wherein each pixel of the plurality of pixels further comprises a color filter facing the pixel electrode to realize one of red, green, and blue colors.

21. The apparatus as claimed in claim 20, wherein the pixels include at least a red pixel configured to display red color, a green pixel configured to display green color, and a blue pixel configured to display blue color, the pixels being arranged to have every two adjacent pixels in the second direction display different colors.

22. The apparatus as claimed in claim 21, wherein every two adjacent pixels adjacent in the first direction display a same color.

23. The apparatus as claimed in claim 17, wherein the first substrate includes a first base substrate, the gate line being on the first base substrate, the data and storage lines being on the first base substrate and on the gate line, the data and storage lines being electrically isolated from the gate line.

* * * * *